(12) United States Patent
Mukith et al.

(10) Patent No.: US 9,102,092 B2
(45) Date of Patent: Aug. 11, 2015

(54) METHODS OF CONNECTING

(75) Inventors: Abdul Mukith, Halifax (GB); Luke Smith, Halifax (GB)

(73) Assignee: A-FAX LIMITED, Yorkshire (GB)

( * ) Notice: Subject to any disclaimer, the term of this patent is extended or adjusted under 35 U.S.C. 154(b) by 0 days.

(21) Appl. No.: 13/579,732

(22) PCT Filed: Feb. 17, 2011

(86) PCT No.: PCT/GB2011/050312
§ 371 (c)(1),
(2), (4) Date: Aug. 17, 2012

(87) PCT Pub. No.: WO2011/104527
PCT Pub. Date: Sep. 1, 2011

(65) Prior Publication Data
US 2012/0321826 A1 Dec. 20, 2012

(30) Foreign Application Priority Data
Feb. 26, 2010 (GB) .................................. 1003274.6

(51) Int. Cl.
*F16M 13/00* (2006.01)
*B29C 47/90* (2006.01)
(Continued)

(52) U.S. Cl.
CPC ........... *B29C 47/903* (2013.01); *B29C 47/0019* (2013.01); *B29C 47/0023* (2013.01); *B29C 65/565* (2013.01); *B29C 65/64* (2013.01);
(Continued)

(58) Field of Classification Search
CPC .. B29C 66/524; B29C 65/565; B29C 66/534; B29C 66/74; B29C 66/752; B29C 66/712; E04H 12/2253; E04H 12/02

USPC .............. 248/518–520, 382; 52/169.9, 302.5, 52/292, 296, 297, 169.13, 169.14, 704, 52/707; 40/607.01, 608, 607.1
See application file for complete search history.

(56) References Cited

U.S. PATENT DOCUMENTS 3,908,947 A * 9/1975 Bledsoe, Jr. ................ 248/188.7
5,568,909 A * 10/1996 Timko .......................... 248/519
(Continued)

FOREIGN PATENT DOCUMENTS

DE    196 43 874 A1    5/1998
GB    2 060 469 A      5/1981

OTHER PUBLICATIONS

Translation of Hans DE 19643874.*
(Continued)

*Primary Examiner* — Christopher Garft
(74) *Attorney, Agent, or Firm* — Oliff PLC

(57) ABSTRACT

A method is provided for connecting an upwardly extending member to a support member including the steps of providing a substantially rigid support member and then extruding plastics material to form a hollow component which will include the upwardly extending member, and then forcing the members together such that the hollow component slides over the support member, the hollow member being such that it deforms elastically as it moves relatively over the base member such that the two members are secured together by a combination of interference fit, and the elastic gripping of the support member by the upwardly extending member. The invention includes an article manufactured using the method according to the invention. The article may include a post attached to a base plate and the article may include part of a plastics barrier or fence system.

14 Claims, 5 Drawing Sheets

(51) Int. Cl.
 B29C 47/00 (2006.01)
 B29C 65/56 (2006.01)
 B29C 65/64 (2006.01)
 B29C 65/00 (2006.01)
 E04H 12/02 (2006.01)
 E04H 12/22 (2006.01)
 B29L 31/00 (2006.01)

(52) U.S. Cl.
 CPC ............ B29C66/524 (2013.01); B29C 66/534 (2013.01); B29C 66/742 (2013.01); E04H 12/02 (2013.01); E04H 12/2261 (2013.01); B29C 66/71 (2013.01); B29C 66/73711 (2013.01); B29C 66/74283 (2013.01); B29L 2031/766 (2013.01); Y10T 29/49826 (2015.01); Y10T 428/13 (2015.01)

(56) References Cited

U.S. PATENT DOCUMENTS

| | | | |
|---|---|---|---|
| 5,848,502 A * | 12/1998 | Schaefer | 52/165 |
| 5,901,525 A * | 5/1999 | Doeringer et al. | 52/835 |
| 6,282,861 B1 * | 9/2001 | Natelli, Jr. | 52/836 |
| 6,336,620 B1 * | 1/2002 | Belli | 248/519 |
| 6,742,748 B1 * | 6/2004 | Gretz | 248/156 |
| 7,155,867 B2 * | 1/2007 | Saldarelli et al. | 52/292 |
| 7,195,222 B2 * | 3/2007 | Dent | 248/511 |
| D610,717 S * | 2/2010 | Lin | D25/133 |
| 7,677,000 B2 * | 3/2010 | Walker | 52/296 |
| 8,074,955 B2 * | 12/2011 | Kumar et al. | 248/519 |
| 8,104,732 B1 * | 1/2012 | Robinson et al. | 248/346.01 |
| 2005/0098772 A1 * | 5/2005 | Fuoco | 256/65.14 |
| 2005/0204654 A1 * | 9/2005 | Fredrickson | 52/169.13 |
| 2006/0273295 A1 * | 12/2006 | Maly et al. | 256/45 |
| 2007/0158526 A1 * | 7/2007 | Platt | 248/519 |
| 2008/0104899 A1 * | 5/2008 | Hill | 52/165 |
| 2008/0272353 A1 * | 11/2008 | Fattori | 256/19 |
| 2010/0001166 A1 * | 1/2010 | Kumar et al. | 248/519 |
| 2011/0073824 A1 * | 3/2011 | Lappin et al. | 256/65.08 |

OTHER PUBLICATIONS

May 25, 2011 Written Opinion of the International Searching Authority issued in International Patent Application No. PCT/GB2011/050312.

May 25, 2011 International Search Report issued in International Patent Application No. PCT/GB2011/050312.

* cited by examiner

METHODS OF CONNECTING

FIELD OF THE INVENTION

The invention relates to methods of connecting an upwardly extending member, for example a post, to a support member, for example a base plate.

One application of the method according to the invention is to provide a secure means of connecting or anchoring a plastics component to a metal footplate. The plastics component may comprise part of a plastics barrier or fence system. The metal footplate may be of steel.

BACKGROUND OF THE INVENTION

There is very little knowledge of products that use a plastic barrier system with a steel footplate. There is one known product that comprises a glass reinforced plastics (GRP) handrail system but this does not use a steel footplate for anchorage of the handrail system.

All the GRP systems use a loose fitting sleeve which fits over a mating projection. Once the GRP section has been fitted onto a moulded footplate, by means of a loose fit, the components then have to be additionally secured, for example using a fixing bolt, which will generally also be of steel.

In other words the loose fit items are not self supportive and they must be bolted together.

SUMMARY OF THE INVENTION

The invention provides a method of connecting an upwardly extending member to a support member, comprising the steps of providing a substantially rigid support member and then extruding plastics material to form a hollow component which will comprise the upwardly extending member, and then forcing the members together such that the hollow component slides over the support member, the hollow member being such that it deforms elastically as it moves relatively over the base member, such that the two members are secured together by a combination of interference fit, and the elastic gripping of the support member by the upwardly extending member.

The upwardly extending member may comprise a post.

The support member may comprise a base plate.

The upwardly extending member may be made of polypropylene.

The support member may be made of steel.

The support member may be provided with at least protrusion, for example a dimple, to add a mechanical keying effect to the features securing the two members together. The material of the upwardly extending member preferably has molecular properties in the form of randomly orientated tangled polymer chains, the polymer chains then being stretched and orientated, thus aligning the chain molecules, during the extrusion process.

The invention includes an article manufactured using the method according to the invention.

The article may comprise a post attached to a base plate.

The article may comprise part of a plastics barrier or fence system.

BRIEF DESCRIPTION OF THE DRAWINGS

By way of example, specific embodiments of the invention will now be described, with reference to the accompanying drawings, in which.

DETAILED DESCRIPTION OF THE EMBODIMENTS

The steel base plate used in this embodiment comprises a square base 10 having at each corner a bolt hole 11 for use in fixing the component to a base structure (not shown) for example a slab of concrete.

Projecting upwardly from the square base 10 is a square cross-section tube 12 constructed by welding together two C-shaped portions of steel 13, 14 and welding this tube 12 to the base 10.

In other embodiments, the square cross-section tube may be created in other ways and other cross-sections may be used including rectangular and round cross-sections.

Figure 2:
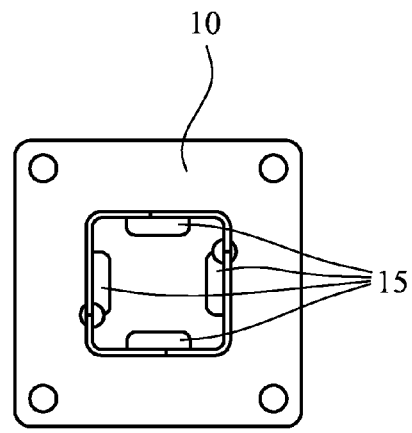
FIG. 2 is a plan view of the base plate.

As seen if FIG. 2, the cross-section tube 12 is attached to the base 10 by four thick welds 15.

The components 13 and 14 are connected to each other by other thick welds 16.

An important feature of this embodiment of the invention is that further welds are applied to create dimples 17.

Figure 1:
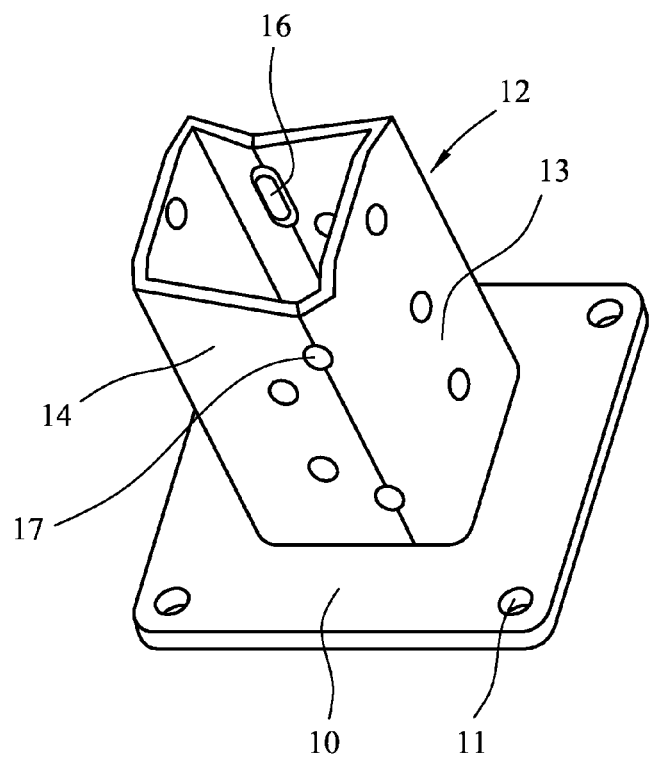
FIG. 1 is a perspective view of a base plate for use in an embodiment of method according to the invention.

The structure shown in FIG. 1 is intended to support and secure in place an elongate post, which may for example comprise part of a fence or barrier.

Figure 5:
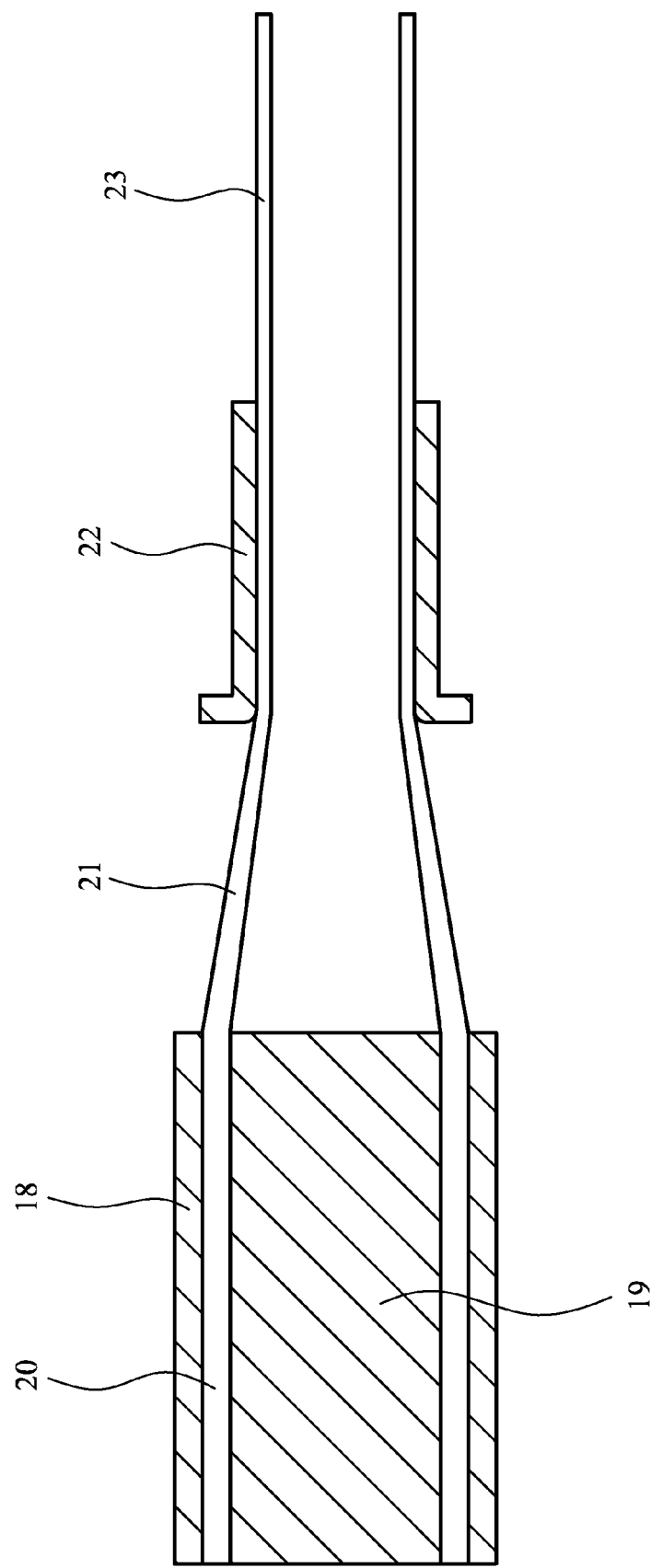
FIG. 5 is a view illustrating the manufacture of a post for use in the embodiment of method according to the invention.

It is an important part of this embodiment of the invention that the post specially manufactured to critical tolerances, using an extrusion process. As shown in FIG. 5, plastics material, and particularly polymeric plastics material, for example polypropylene, is extruded into a square cross-section using dies 18 and 19.

The plastics material 20, being extruded between the dies 18 and 19, has its polymeric material, at this stage, in the form of randomly orientated tangled polymer chains.

The plastics material emerges from the dies at 21 as an unformed profile, and is then drawn down to size using a calibration and cooling unit 22. As the material is drawn down to size the polymer chains are stretched and orientated thus aligning the chain molecules.

The final polymer profile 23 is calibrated through the unit 22 to maintain its new shape together with the molecular oriented properties.

The average draw down during extrusion of the plastic profile is 10-100%. One example is 10-50% draw down. Another example is 20-40% draw down.

The internal and external corners of the square post profile are designed to minimise the stress concentration imposed on the plastic post by the oversized steel base plate.

Figure 6A:
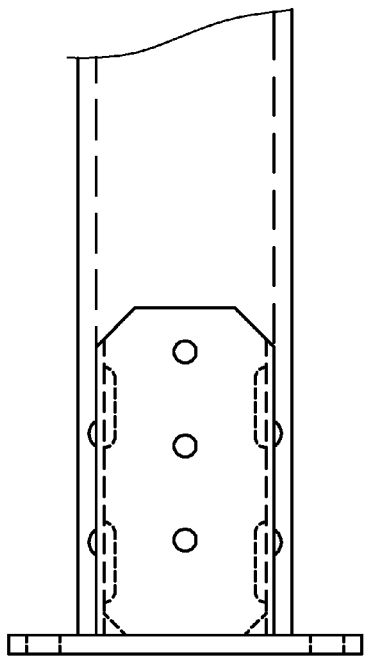
FIGS. 6A to 6D illustrate the post fitted to the base plate.
Figure 6C:
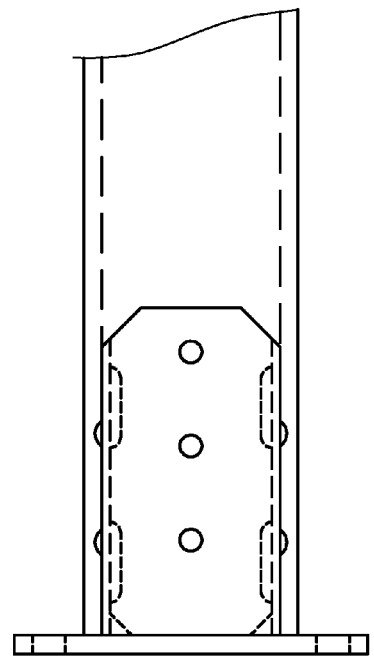
Figure 6B:
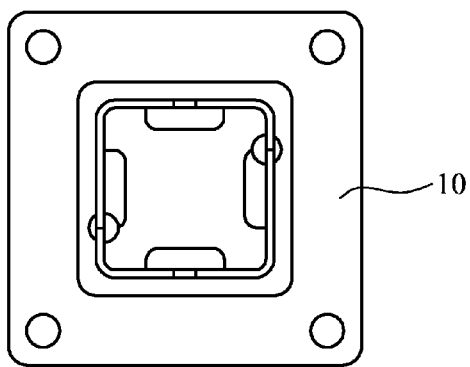

As shown in FIGS. 6A and 6B, the finished profile 23 is secured to the base plate, without the need for bolts or other fixing devices, by forcing the oriented profile down over the steel square cross-section 12 to form an interference fit.

The interference fit results firstly from the fact that the finished profile 23 is slightly undersized with respect to the steel component 12, but is also assisted by the dimples 17.

Figure 6D:
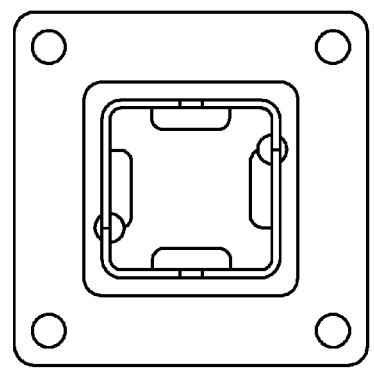

FIGS. 6C and 6D illustrate the region of interference between the polymer profile 23 and the base plate component 12.

Figure 7A:
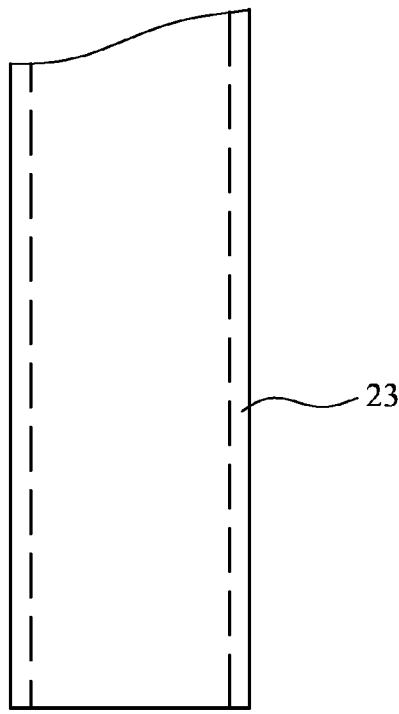
FIGS. 7A to 7D illustrate how the post deforms during the execution of the method.
Figure 7B:
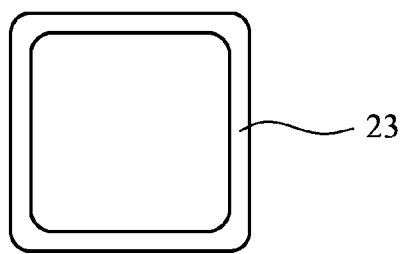

FIGS. 7A and 7B illustrate the shape of the profile 23 after it has been oriented, but before it is forced down over a component 12.

Figure 7C:
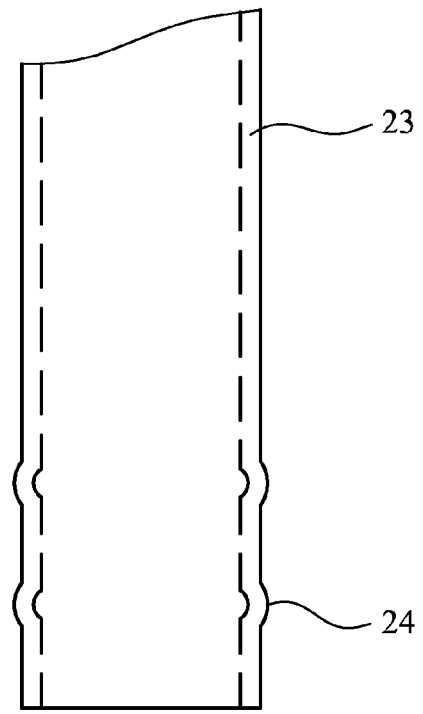
Figure 7D:
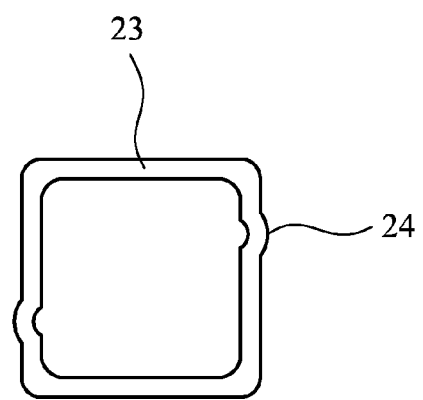

FIGS. 7A and 7C illustrate the polymer profile shape after deformation, the deformation caused by the dimples been clearly seen at 24.

Figure 8A:
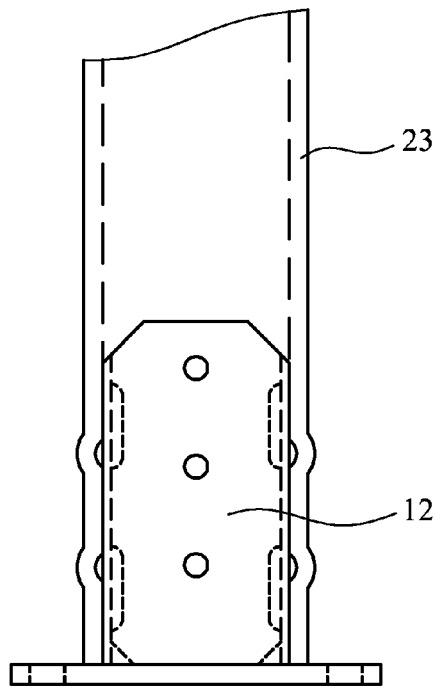
FIGS. 8A to 8D illustrate the displacement of the plastics material, the deformation of shape, and the way in which compressive forces are introduced by the method according to this embodiment of the invention.
Figure 8C:
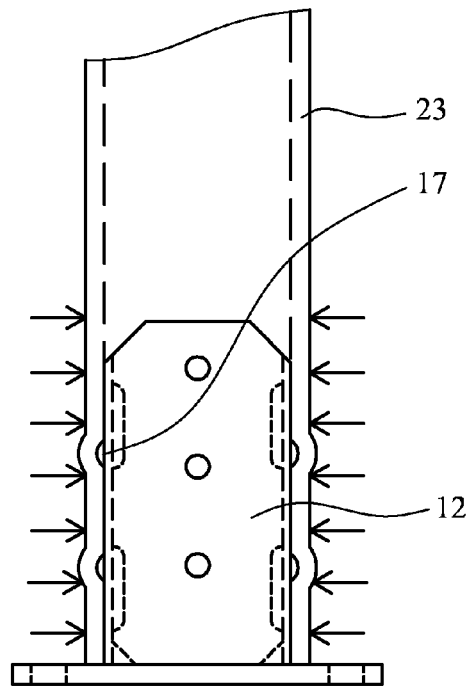
Figure 8B:
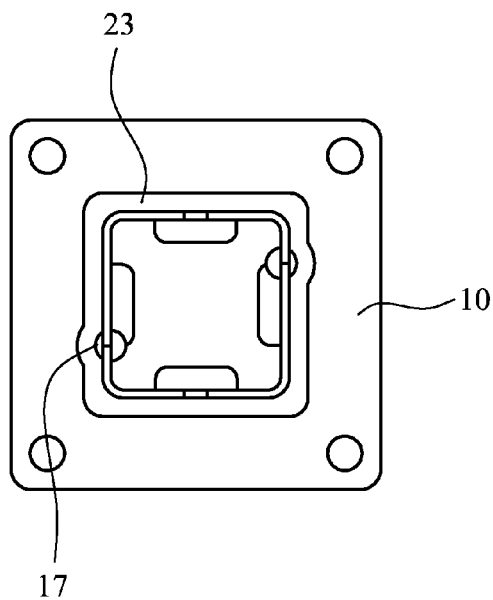

FIGS. 8A and 8B illustrate the displacement of the polymer profile and the deformation of shape.

Figure 8D:
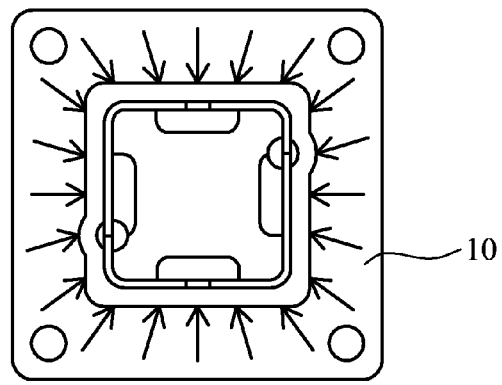

FIGS. 8C and 8D illustrate the compression forces that are brought about in the region of displacement of the polymer profile. Thus the polymer profile 23 physically grips the component 12 tightly while at the same time the deformation of the profile around the dimples 17 bring about a mechanical keying effect.

In one example of barrier post, the internal measurements of the plastics post are 90×90 mm, while the external measurements of the component 12 are 92×92 mm. When these parts are pressed into one another, the friction between the two parts is very high, resulting in an extremely strong interference fit. As illustrated in FIGS. 8C and 8D, the pressure is constant through the entire surface area of contact between the external surface of the component 12 and the internal surface of the profile 23.

As the component 12 is steel which is a rigid material and the profile 23 is plastics, usually polypropylene, which is malleable, when the components are forced together, the steel base does not deform, whereas the plastics post does, in order to fit over and around the steel component. This deformation, in the example having the measurements just described, may be from 1 to 2 mm in displacement.

Under normal circumstances a stiff material will fail due to the displacement/deformation of the post but products manufactured according to this embodiment of the invention work well owing to the unique material properties and geometries of the parts.

Important aspects of this embodiment include the following:
  extruded profiles of a polyolefin base material;
  selected profile shapes, which need not necessarily be square (rectangular or round profiles may be used for example);
  die drawn extrusion;
  the creation of molecular orientated profile extrusions, which have a memory, and thus would return to their original form after deformation, upon removal of load. Because the extrusion are trying to return to their original form, they continually grip the metal component onto which they are fitted.

The molecular orientated profiles exhibit great tensile strengths in the direction of extrusion, similar to that of timber in the direction of the grain.

A moulded post would not provide the benefits of this embodiment of the invention.

A moulded post would not exhibit the same strength as that of a molecular orientated extruded part.

A moulded part would not acquire the same level of memory and so would not produce the same gripping effect.

If a moulded part were deformed beyond the plastic limits, the deformation would be permanent. If a moulded part was used in an attempt to create an interference fit, the moulded part would deform around the metal component when initially connected to the metal component but would then maintain the new dimension, thus not attempting to return to the original form and therefore not applying significant pressure around the metal component. This pressure is essential to maintain an effective anchorage for the post.

Figure 3:
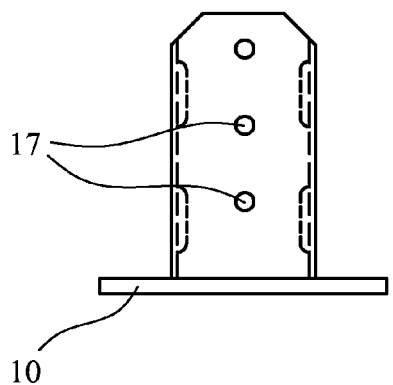
FIG. 3 is a view of the base plate from one side.
Figure 4:
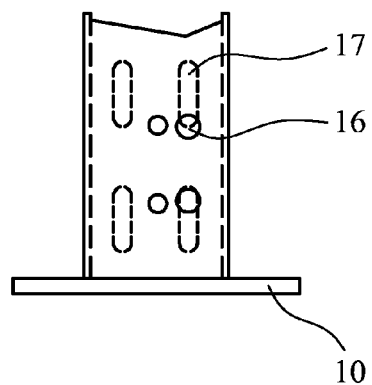
FIG. 4 is a view of the base plate from another side.

The top of the component 12 is designed and shaped in order to minimise the stress applied to the plastics profile during fitting. As it provides a leading edge, as best shown in FIG. 3, it guides the polypropylene profile during the initial phase of fitting the profile to the steel component, via a high powered press having a hydraulic ram.

The typical forces of pressure required to fit a thick walled polypropylene square profiles and steel base plate together may be in the order of 50-200 kg/cm$^2$.

An example of the pressure required to insert the 110 mm square profile post with a 10 mm wall thickness onto the steel base plate is between 102-104 kg/cm$^2$.

Another example of the pressure required to insert a 110 mm square profile post with a 11 mm wall thickness onto the steel base plate is between 130-135 kg/cm$^2$.

Another example of the pressure required to insert a 90 mm square profile post with a 7.5 mm wall thickness onto the steel base plate is between 76-78 kg/cm$^2$.

Another example of the pressure required to insert a 75×50 mm rectangular profile post with a 6 mm wall thickness onto the steel base plate having similar interference is between 51-53 kg/cm$^2$.

The reaction pressure from the interference fit is constant, this is applied to the surface area on the internal of the plastic post section and the external of upright section of the steel base plate, for a standard base the surface area may be of the order of 0.02-0.08 m$^2$.

One example is, a 110 mm square profile post with a 10 mm wall thickness fitted onto a corresponding steel base plate, the pressure is applied to a 0.06 m$^2$ surface area.

Another example is, a 90 mm square profile post with a 7.5 mm wall thickness fitted onto a corresponding steel base plate, the pressure is applied to a 0.045 m$^2$ surface area.

Another example is, a 75×50 mm rectangular profile post with a 6 mm wall thickness fitted onto a corresponding steel base plate the pressure is applied to a 0.025 m$^2$ surface area.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of forming a bather post by connecting a post, which is elongate and hollow, to a support member so that the elongate post extends upwards from the support member, the method comprising the steps of:
   providing the support member, which is substantially rigid,
   providing the elongate post, which is formed by extruding plastics material, and
   forcing the elongate post and the support member together (1) such that the elongate post slides over the support member, (2) such that the elongate post is deformed elastically by the support member as it moves relatively over the support member, and (3) such that the elongate post and the support member are secured together by a combination of interference fit and elastic gripping of the support member by the elongate post and in which the elastic deformation radially deforms the elongate post outward.

2. A method as claimed in claim 1 in which the support member comprises a base plate.

3. A method as claimed in claim 1 in which the elongate post is made of polypropylene.

4. A method as claimed in claim 1 in which the support member is made of steel.

5. A method as claimed in claim 1 in which an outer surface of the support member is provided with at least one protrusion extending from the outer surface to add a mechanical keying effect to the features securing the elongate post and the support member together.

6. A method as claimed in claim 1 in which the material of the elongate post has molecular properties in the form of randomly orientated tangled polymer chains, the polymer chains then being stretched and orientated, thus aligning the chain molecules, during the extrusion process.

7. A barrier post manufactured using a method as claimed in claim 1,
   wherein the barrier post comprises the elongate post secured to the support member such that the elongate post extends upwardly from the support member, and
   wherein the elongate post is elongate and hollow and is formed from the plastics material to have an internal dimension that is smaller than an external dimension of the support member so that the elongate post and the support member are secured together by the combination of the interference fit and the elastic gripping of the support member by the elongate post.

8. A method as claimed in claim 5 in which the at least one protrusion is a dimple.

9. A method as claimed in claim 8 in which a portion of the dimple in contact with the outer surface of the support member is substantially circular.

10. A method as claimed in claim 5 in which a plurality of protrusions are provided on the outer surface of the support member in a direction parallel to the upward extending direction of the elongate post.

11. A method as claimed in claim 1 in which an outer perimeter of the support member is greater than an inner perimeter of the elongate post.

12. A method as claimed in claim 1 in which an inner perimeter of the elongate post is in contact with substantially an entire outer perimeter of the support member.

13. A method as claimed in claim 1 in which a hollow portion of the elongate post extends upwards from the support member.

14. A method of forming a barrier post by connecting a post, which is elongate and hollow, to a support member so that the elongate post extends upwards from the support member, the method comprising the steps of:
   providing the support member, which is substantially rigid,
   providing the elongate post, which is formed by extruding plastics material and which has an internal dimension that is smaller than an external dimension of the support member, and
   forcing the elongate post and the support member together (1) such that the elongate post slides over the support member, (2) such that the elongate post deforms elastically as it moves relatively over the support member, and (3) such that the elongate post and the support member are secured together by a combination of interference fit and elastic gripping of the support member by the elongate post and in which the elastic deformation radially deforms the elongate post outward.

* * * * *